(12) United States Patent
Andreopoulos et al.

(10) Patent No.: US 11,445,222 B1
(45) Date of Patent: Sep. 13, 2022

(54) PREPROCESSING IMAGE DATA

(71) Applicant: iSize Limited, London (GB)

(72) Inventors: Ioannis Andreopoulos, London (GB);
Aaron Chadha, London (GB)

(73) Assignee: ISIZE LIMITED, London (GB)

(*) Notice: Subject to any disclaimer, the term of this patent is extended or adjusted under 35 U.S.C. 154(b) by 200 days.

(21) Appl. No.: 17/037,339

(22) Filed: Sep. 29, 2020

Related U.S. Application Data

(60) Provisional application No. 62/908,178, filed on Sep. 30, 2019.

(51) Int. Cl.
| | | |
|---|---|---|
| *H04N 19/85* | (2014.01) | |
| *H04N 19/80* | (2014.01) | |
| *H04N 19/124* | (2014.01) | |
| *H04N 19/65* | (2014.01) | |
| *H04N 19/176* | (2014.01) | |
| *H04L 65/65* | (2022.01) | |
| *H04L 67/02* | (2022.01) | |

(52) U.S. Cl.
CPC .......... *H04N 19/85* (2014.11); *H04N 19/124* (2014.11); *H04N 19/176* (2014.11); *H04N 19/65* (2014.11); *H04N 19/80* (2014.11); *H04L 65/608* (2013.01); *H04L 67/02* (2013.01)

(58) Field of Classification Search
USPC .................................................. 375/240.03
See application file for complete search history.

(56) References Cited

U.S. PATENT DOCUMENTS

| | | | |
|---|---|---|---|
| 5,781,665 A | * | 7/1998 | Cullen ...................... G06T 7/11 348/268 |
| 6,836,512 B2 | | 12/2004 | Van Der Schaar et al. |
| 7,336,720 B2 | | 2/2008 | Martemyanov et al. |
| 7,418,432 B2 | * | 8/2008 | Calise .................. G05B 13/027 706/23 |
| 8,165,197 B2 | | 4/2012 | Douma et al. |
| (Continued) | | | |

FOREIGN PATENT DOCUMENTS

| | | |
|---|---|---|
| EP | 3493149 A1 | 6/2019 |
| GB | 2548749 A | 9/2017 |
| (Continued) | | |

OTHER PUBLICATIONS

Ozer, Streaming Media Mag., "Buyers' Guide to Video Quality Metrics", Mar. 29, 2019, 9 pages.

(Continued)

*Primary Examiner* — Behrooz M Senfi
(74) *Attorney, Agent, or Firm* — Patterson + Sheridan LLP

(57) ABSTRACT

Certain aspects of the present disclosure provide techniques for preprocessing, prior to encoding with an external encoder, image data using a preprocessing network comprising a set of inter-connected weights is provided. At the preprocessing network, image data from one or more images is received. The image data is processed using the preprocessing network to generate an output pixel representation for encoding with the external encoder. The weights of the preprocessing network are trained to optimize a combination of at least one quality score indicative of the quality of the output pixel representation and a rate score indicative of the bits required by the external encoder to encode the output pixel representation.

20 Claims, 11 Drawing Sheets

(56) References Cited

U.S. PATENT DOCUMENTS

| | | |
|---|---|---|
| 9,100,660 B2 | 8/2015 | Su et al. |
| 2012/0033040 A1 | 2/2012 | Pahalawatta et al. |
| 2013/0195201 A1 | 8/2013 | Boyce et al. |
| 2017/0070745 A1* | 3/2017 | Lee .................. H04N 19/61 |
| 2017/0180736 A1* | 6/2017 | Yang ................. H04N 21/2402 |
| 2018/0131953 A1 | 5/2018 | Wang et al. |
| 2019/0075301 A1 | 3/2019 | Chou et al. |
| 2020/0027251 A1* | 1/2020 | Demesmaeker ...... G06T 11/006 |
| 2020/0145661 A1* | 5/2020 | Jeon .................. H04N 19/136 |
| 2020/0186810 A1* | 6/2020 | Zheludkov ............ H04N 19/18 |
| 2020/0356827 A1* | 11/2020 | Dinerstein ......... G06K 9/00744 |

FOREIGN PATENT DOCUMENTS

| | | |
|---|---|---|
| WO | 9962265 A1 | 12/1999 |
| WO | 2014018050 A1 | 1/2014 |
| WO | 2019009489 A1 | 1/2019 |

OTHER PUBLICATIONS

Dong et al., "Adaptive downsampling for high-definition video coding." IEEE Transactions on Circuits and Systems for Video Technology 24.3 (2014): 480-488.

Shen et al., "Down-sampling based video coding using super-resolution technique." IEEE Transactions on Circuits and Systems for Video Technology 21.6 (2011): 755-765.

Dar et al., "Improving low bit-rate video coding using spatio-temporal down-scaling." arXiv preprint arXiv:1404.4026 (2014).

Search Report for European Patent Application No. 20199342.5 dated Oct. 27, 2020, 11 pages.

Examination Report for European Patent Application No. 20199342.5 dated Jun. 14, 2021, 6 pages.

\* cited by examiner

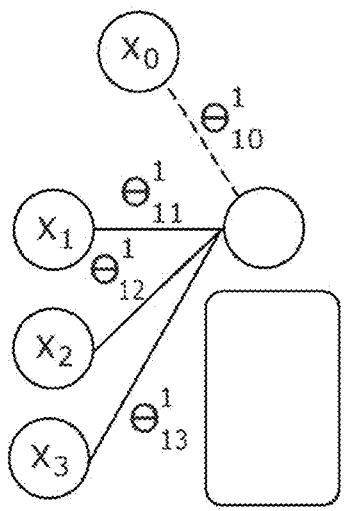

$$g(\Theta_{10}^1 x_0 + \Theta_{11}^1 x_1 + \Theta_{12}^1 x_2 + \Theta_{13}^1 x_3)$$

$\Theta_{13}^1$ means:

1 (superscript) - mapping from layer 1
1 - mapping to node 1 in layer 2 (L+1)
3 - mapping from node 3 in layer 1 (L)

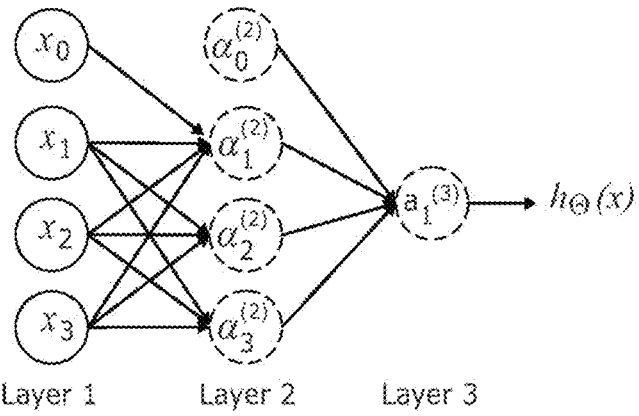

Figure 2(b)

$$a_1^{(2)} = g(\Theta_{10}^{(1)} x_0 + \Theta_{11}^{(1)} x_1 + \Theta_{12}^{(1)} x_2 + \Theta_{13}^{(1)} x_3)$$

$$a_2^{(2)} = g(\Theta_{20}^{(1)} x_0 + \Theta_{21}^{(1)} x_1 + \Theta_{22}^{(1)} x_2 + \Theta_{23}^{(1)} x_3)$$

$$a_3^{(2)} = g(\Theta_{30}^{(1)} x_0 + \Theta_{31}^{(1)} x_1 + \Theta_{32}^{(1)} x_2 + \Theta_{33}^{(1)} x_3)$$

$$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$$

PREPROCESSING IMAGE DATA

CROSS-REFERENCE TO RELATED APPLICATIONS

This application claims the benefit of U.S. Provisional Patent Application No. 62/908,178, filed on Sep. 30, 2019, the entire contents of which are incorporated herein by reference.

INTRODUCTION

Technical Field

The present disclosure concerns computer-implemented methods of preprocessing image data prior to encoding with an external encoder. The disclosure is particularly, but not exclusively, applicable where the image data is video data.

Background

When a set of images or video is streamed over the HTTP protocol of the internet, or over a dedicated IP packet switched or circuit-switched connection using other protocols, a range of streaming and encoding recipes must be selected in order to ensure the best possible use of the available bandwidth. To achieve this, (i) the image or video encoder must be tuned to provide for some bitrate control mechanism and (ii) the streaming server must provide for the means to control or switch the stream when the bandwidth of the connection does not suffice for the transmitted data. Methods for tackling bitrate control in (i) include [5]-[8]: constant bitrate (CBR) encoding, variable bitrate (VBR) encoding, or solutions based on a video buffer verifier (VBV) model [5]-[8], such as QVBR, CABR, capped-CRF, etc. All of these solutions control the parameters of the adaptive quantization and intra-prediction or inter-prediction per image [5]-[8] in order to provide the best possible reconstruction accuracy for the decoded images or video at the smallest number of bits. Methods for tackling stream adaptation in (ii), are the DASH and HLS protocols—namely, for the case of adaptive streaming over HTTP. Under adaptive streaming, the adaptation includes the selection of a number of encoding resolutions, bitrates and encoding templates. Therefore, the encoding and streaming process is bound to change the frequency content of the input video and introduce (ideally) imperceptible or (hopefully) controllable quality loss in return for bitrate savings. This quality loss is measured with a range or quality metrics, ranging from low-level signal-to-noise ratio metrics, all the way to complex mixtures of expert metrics that capture higher-level elements of human visual attention and perception. One such metric that is now well-recognized by the video community and the Video Quality Experts Group (VQEG) is the Video Multi-method Assessment Fusion (VMAF), proposed by Netflix. There has been a lot of work in VMAF to make it a "self-interpretable" metric: values close to 100 (e.g. 93 or higher) mean that the compressed content is visually indistinguishable from the original, while low values (e.g. below 70) mean that the compressed content has significant loss of quality in comparison to the original. It has been reported [Ozer, Streaming Media Mag., "Buyers' Guide to Video Quality Metrics", Mar. 29, 2019] that a difference of around 6 points in VMAF corresponds to the so-called Just-Noticeable Difference (JND), i.e. quality difference that will be noticed by the viewer.

The process of encoding and decoding often requires the use of linear filters for the production of the decoded (and often upscaled) content that the viewer sees on their device. Unfortunately, this tends to lead to uncontrolled quality fluctuation in video playback, or poor-quality video playback in general. A viewer will often experience this when viewing on a mobile device, due to an inconsistent connection and/or bandwidth. For example, moving in or through an area with poor 4G/WiFi signal strength or the like, can cause a high-bitrate encoding of a 4K stream to be quickly switched to a much lower-bitrate/lower-resolution encoding, which the decoder and video player will keep on upscaling to the display device's resolution while the viewer continues watching.

Technical solutions to this problem can be grouped into three distinct categories.

The first type of approaches consists of solutions attempting device-based enhancement, i.e. advancing the state-of-the-art in intelligent video upscaling at the video player when the content has been "crudely" downscaled using a linear filter like the bicubic or variants of the Lanczos or other polyphase filters [1]-[3],[10]-[15]. These approaches include SoC solutions embedded within the latest 8K televisions. While there have been some promising advances in this domain, this type of approach is limited by the stringent complexity constraints and power consumption limitations of consumer electronics. In addition, since the received content at the client is already distorted from the compression (quite often severely so), there are theoretical limits to the level of picture detail that can be recovered by client-side upscaling.

A second family of approaches consists of the development of bespoke image and video encoders, typically based on deep neural networks [10][12][1][13][14]. This deviates from encoding, stream-packaging and stream-transport standards and creates bespoke formats, so has the disadvantage of requiring bespoke transport mechanisms and bespoke decoders in the client devices. In addition, in the 50+ years video encoding has been developed most opportunities for improving gain in different situations have been taken, thereby making the current state-of-the-art in spatio-temporal prediction and encoding very difficult to outperform with neural-network solutions that are designed from scratch and learn from data.

The third family of methods comprises perceptual optimization of existing standards-based encoders by using perceptual metrics during encoding. Here, the challenges are that: i) the required tuning is severely constrained by the need for compliance to the utilized standard; ii) many of the proposed solutions tend to be limited to focus-of-attention models or shallow learning methods with limited capacity, e.g. assuming that the human gaze is focusing on particular areas of the frame (for instance, in a conversational video we tend to look at the speaker(s), not the background) or using some hand-crafted filters to enhance image slices or groups of image macroblocks prior to encoding; and iii) such methods tend to require multiple encoding passes, thereby increasing complexity.

Because of these issues, known designs are very tightly coupled to the specific encoder implementation. Redesigning them for a new encoder and/or new standard, e.g., from HEVC to VP9 encoding, can require substantial effort.

The present disclosure seeks to solve or mitigate some or all of these above-mentioned problems. Alternatively and/or additionally, aspects of the present disclosure seek to provide improved methods of processing image data, and in particular methods that can be used in combination with existing image and video codec frameworks.

BRIEF SUMMARY

In accordance with a first aspect of the present disclosure there is provided a computer-implemented method of pre-processing, prior to encoding using an external encoder, image data using a preprocessing network comprising a set of inter-connected weights, the method comprising: receiving, at the preprocessing network, image data from one or more images; and processing the image data using the preprocessing network to generate an output pixel representation for encoding with the external encoder, wherein the weights of the preprocessing network are trained to optimize a combination of: at least one quality score indicative of the quality of the output pixel representation; and a rate score indicative of the bits required by the external encoder to encode the output pixel representation.

By using a preprocessing network in the described manner, a visual quality of the subsequently encoded and decoded image data may be improved for a given encoding bitrate, and/or an encoding bitrate to achieve a given visual quality may be reduced. In particular, the objective, perceptual and/or aesthetic quality of post-decoded images or videos may be improved. Fidelity of the subsequently encoded and decoded image data to the original image data may also be improved through use of the methods described herein. The use of weights trained to optimize quality and rate scores improves the performance of the preprocessing network, and enables the preprocessing of the image data to be performed optimally in order to make the external encoder (which may be a standards-based encoder) operate as efficiently as possible. Further, the output pixel representation can be upscaled by a client device using its existing linear filters.

The described methods include technical solutions that are learnable based on data and can utilize a standard image/video encoder with a predetermined encoding recipe. An overall technical question addressed can be abstracted as: how to optimally preprocess (or "precode") the pixel stream of a video into a (typically) smaller pixel stream, in order to make standards-based encoders as efficient (and fast) as possible? This question may be especially relevant where the client device can upscale the content with its existing linear filters, and/or where perceptual quality is measured with the latest advances in perceptual quality metrics from the literature, e.g., using VMAF or similar metrics.

Advantageously, the at least one quality score is indicative of signal distortion in the output pixel representation. For example, the image data may be preprocessed such that signal distortion in the output pixel representation is minimized. In embodiments, the at least one quality score is indicative of loss of perceptual or aesthetic quality in the output pixel representation.

In embodiments, the resolution of the output pixel representation is increased or decreased in accordance with an upscaling or downscaling ratio. For example, the resolution of the output pixel representation may be lower than the resolution of the received image data. By downscaling the image prior to using the external encoder, the external encoder can operate more efficiently by processing a lower resolution image. Moreover, the parameters used when downscaling/upscaling can be chosen to provide different desired results, for example to improve accuracy (i.e. how similarly the recovered images are to the original). Further, the downscaling/upscaling process may be designed to be in accordance with downscaling/upscaling performed by the external encoder, so that the downscaled/upscaled images can be encoded by the external encoder without essential information being lost.

In embodiments, the output pixel representation is corrupted by applying one or more mathematically differentiable functions and an approximation, wherein the output pixel representation is corrupted so as to approximate the corruption expected from a block-based transform and quantization used in the external encoder, and/or to approximate the corruption expected from a transform and quantization of errors computed from a block-based temporal prediction process used in the external encoder. Corrupting the output pixel representation introduces a loss of fidelity (e.g. blocking artefacts) which emulates fidelity losses introduced from typical encoders used to compress image or video data. This allows the disclosed system to utilize such emulated behavior in its operation and optimization process.

In embodiments, the output pixel representation is resized to the resolution of the input image data, using a linear or non-linear filter configured during an initial setup or training phase. This can allow the quality scores for the output pixel representation to be quantified (i.e. by assessing the quality of the resized output). Resizing may emulate a process on a client decoder for displaying pixel content at a given resolution.

Advantageously, the preprocessing network comprises an artificial neural network including multiple layers having a convolutional architecture, with each layer being configured to receive the output of one or more previous layers. In embodiments, the outputs of each layer of the preprocessing network are passed through a non-linear parametric linear rectifier function, pReLU. Other non-linear functions may be used in other embodiments.

In embodiments, during an initial setup or training phase: the at least one quality score is optimized in a direction of improved visual quality or reconstruction; and the rate score is optimized in a direction of lower rate. In embodiments, one of the at least one quality score and the rate score is fixed during training, and the other of the at least one quality score and the rate score is optimized. In other embodiments, both the at least one quality score and the rate score are optimized.

In embodiments, the least one quality score and the rate score are optimized according to a linear or non-linear optimization method that adjusts the weights of the preprocessing network and/or adjusts the type of the architecture used to interconnect the weights of the preprocessing network.

In embodiments, the output pixel representation is encoded with the external encoder. In embodiments, the encoded pixel representation is output for transmission, for example to a decoder, for subsequent decoding and display of the image data. In embodiments, the external encoder is an ISO JPEG or ISO MPEG standard encoder, or an AOMedia encoder.

In embodiments, the output pixel representation is filtered using a linear filter, the linear filter comprising a blur or edge-enhancement filter. Such a filter may emulate a filter applied at a decoder and/or display device.

In embodiments, the at least one quality score includes one or more of the following: peak-signal-to-noise ratio, structural similarity index metric (SSIM), multiscale quality metrics, detail loss metric or multiscale SSIM, metrics based on multiple quality scores and data-driven learning and training, video multi-method assessment fusion (VMAF), aesthetic quality metrics.

In embodiments, the at least one quality score and the rate score are combined with linear or non-linear weights, and wherein the linear or non-linear weights are trained based on back-propagation and gradient descent methods with representative training data. This allows the configuration and/or operation of the preprocessing network to be optimized.

In accordance with another aspect of the disclosure, there is provided a computer-implemented method that transforms groups of pixel input data from a single or a plurality of images or video frames into other groups of pixel data, with the transformed output data being optimized on both of the below sets of scores: a range of scores representing signal distortion, perceptual or aesthetic quality, either independently (i.e., without using reference image or video frames to compare against), or based on reference image or video frames; one or more scores representing the bits required to encode, i.e., compress, the transformed output groups of pixels based on an external image or video encoder; this bitrate is commonly measured in bits-per-pixel (bpp) rate or in bits-per-second (bps), if the images or video frames are processed/encoded or displayed with a certain rate in time (as is common in video signals).

In embodiments, the disclosed transformation method is a computer-implemented method comprising: an optional resizing stage, which can be an upscaling or a downscaling process, or resizing with rate equal to unity to avoid resizing; a pixel-to-pixel mapping based on linear or non-linear combinations of weights, which are inter-connected in a network and can include non-linearities such as activation functions and pooling layers, which makes this mapping correspond to an artificial neural network design.

Concerning the optional resizing stage, resizing can take place with any integer or fractional number and uses a set of filter weights to filter and resize the image, which can be a linear filter or a non-linear filter, such as an artificial neural network that has been trained on data in order to achieve downscaling or upscaling of the input pixel groups according to a distortion minimization criterion, such as minimizing the mean-square error and the error of edge or pixel gradients in the images or videos according to training signals provided and offline training.

The transformed output can optionally be corrupted, in order to introduce loss of fidelity, in a manner that emulates that introduced by a typical image or video encoder in use within commercial image/video compression systems. Examples of this loss of fidelity are, but are not limited to, blocking artefacts from motion compensation in video, blur and frequency changes in the input pixel data due to transformation and quantization done in typical JPEG, MPEG or AOMedia encoders, and other geometric and texture loss of fidelity due to intra-frame prediction methods used in the aforementioned encoders. This loss of fidelity can be designed to emulate the encoding losses expected from typical encoders used to compress image or video data at a range of encoding bitrates, and allows for the disclosed invention and system to represent such emulated behavior in its design and optimization process as a computer program that implements these functions.

In order to make the optimization process learnable based on data and offline training with stored data, or periodic training with newly-acquired data, the functions that compute the quality and rate scores and the functions that emulate the loss of fidelity can be made mathematically differentiable, such that techniques that update weights in an artificial neural network based on output differentiation and error propagation can be used [10][12]. If some functions emulating fidelity loss are not mathematically differentiable, with a typical example being a multi-stage block quantizer, they can be converted into mathematically differentiable functions via continuous differentiable approximations.

In order to quantify quality scores for the transformed (and optionally corrupted) pixels of the provided invention and system, the output may be resized to the original image or video frame dimensions using a linear or non-linear resizing method, such as a filter or an artificial neural network, and quality scores assessed on the resized output. However, the rate scores are preferably assessed on the output of the pixel-to-pixel mapping, prior to any resizing to the original image or video frame dimensions. This is because rate scoring and rate estimation refers to the encoding of the transformed output by a standard image or video encoder (prior to transmission over the network), whereas resizing emulates a process on the client decoder for displaying pixel content at the required resolution.

In order to optimize the utilized weights and parameters associated with the quality and rate scoring, and any parameters associated with loss-of-fidelity emulation, representative inputs can be iteratively processed under a given objective function on the range of quality scores and measurements of the encoding bitrate. This can be done offline in a set-up or training-phase, but can also be repeated online multiple times during the system's operation, in order to adjust to specific content or encoding devices, or fine-tune the already established and utilized transformation weights and quality-rate scoring functions and loss-of-fidelity functions. This training can be performed using statistical regression or fitting methods. Importantly it can also be done using any combination of back-propagation learning and gradient descent updates of weights or errors computed from the utilized scores and quality-loss functions. Back propagation learning can use learning rules that are deterministic or stochastic (random), and gradients can be computed on single inputs, on batches of inputs or on the whole training dataset, per training iteration. The learning parameters, such as the initial learning rate and learning rate decay, can be empirically tuned to optimize speed of training and performance. Batches of training data can be selected in a deterministic or random/pseudo-random manner.

In terms of actual quality scores that can be used by the disclosed methods and system, these include, but are not limited to, one or more of the following objective, perceptual or aesthetic image quality scores: peak-signal-to-noise ratio (PSNR), structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics [13], and variations of these metrics. The quality scores can be reference or non-reference based, with each quality score being optimized in the direction corresponding to increasing visual quality.

In terms of rate scores, they include, but are not limited to, estimations of the bpp rate to encode the new pixel representation produced by the disclosed invention with a set of models using logarithmic, harmonic or exponential functions to model the expected bpp or bps of a standard image or video encoder, but also mixtures of such scores with operational models that emulate the entropy encoding utilized by such encoders, with examples being emulation of context-adaptive arithmetic encoding, Huffman encoding, run-length and predictive encoding. The analytic and/or operational models expressing or emulating the expected rate to encode the transformed outputs of the invention can be converted into mathematically differentiable functions, which can be trained with back-propagation and gradient descent methods and training data that is representative of the bpp or bps rate of the encoder utilized to compress the transformed pixel representation produced by the disclosed invention. The rate score can be optimized by minimizing the bbp or bps rate, which can be done in one of three ways: (i) by directly minimizing the rate score with no constraint; (ii) by minimizing the rate score subject to a global fixed rate constraint over all input data; (iii) by minimizing the distance between the rate score and a reference rate score per input image or video.

The multiple quality and multiple rate scores can be combined into a single objective function using both linear and non-linear functions. Examples of linear functions are additions of the scores with weight coefficients. Examples of non-linear functions are additions of non-linear functions of these scores using logarithmic, exponential, sigmoid, harmonic or other types of non-linear functions. The parameters of the weights and functions combining the multiple quality and rate scores can also be trainable parameters that can be optimized using back-propagation and gradient descent methods, with representative training data corresponding to quality and rate results from quality metrics and rate models. Beyond such training, the parameters can also be optimized using linear or non-linear regression, statistical fitting tests, and Bayesian methods incorporating prior knowledge about the input data into the model.

In embodiments, the external encoder comprises an image codec. In embodiments, the image data comprises video data and the one or more images comprise frames of video. In embodiments, the external encoder comprises a video codec.

The methods of processing image data described herein may be performed on a batch of video data, e.g. a complete video file for a movie or the like, or on a stream of video data.

In accordance with another aspect of the disclosure there is provided a computing device comprising: a processor; and memory; wherein the computing device is arranged to perform using the processor any of the methods described above.

In accordance with another aspect of the disclosure there is provided a computer program product arranged, when executed on a computing device comprising a process or memory, to perform any of the methods described above.

It will of course be appreciated that features described in relation to one aspect of the present disclosure described above may be incorporated into other aspects of the present disclosure.

BRIEF DESCRIPTION OF THE DRAWINGS

Embodiments of the present disclosure will now be described by way of example only with reference to the accompanying schematic drawings of which:

FIGS. 2(a) to 2(c) are schematic diagrams showing a preprocessing network in accordance with embodiments;

DETAILED DESCRIPTION

Embodiments of the present disclosure are now described.

Figure 1:
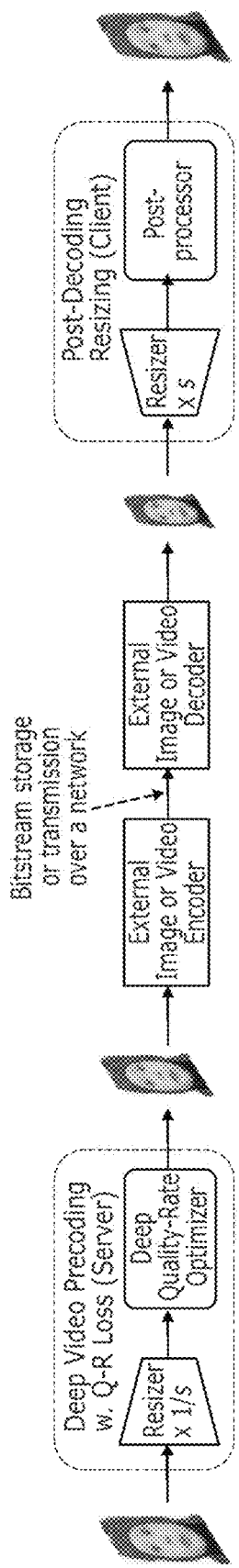
FIG. 1 is a schematic diagram of a method of processing image data in accordance with embodiments.

FIG. 1 is a schematic diagram showing a method of processing image data, according to embodiments. Image or video input data is encoded and decoded with an external image or video encoder. The embodiments depicted are applicable to batch processing, i.e. processing a group of images or video frames together without delay constraints (e.g. an entire video sequence), as well as to stream processing, i.e. processing only a limited subset of a stream of images or video frames, or even a select subset of a single image, due to delay or buffering constraints. The method depicted in FIG. 1 includes deep precoding, prior to encoding with the external encoder, with quality-rate score optimization (and optional resizing) within the transmission pipeline.

The first component processing the input image or video frames comprises the deep precoding with quality-rate loss (also referred to as 'Q-R loss', as depicted in FIG. 1). This precoding consists of a resizer and a deep quality-rate optimizer component. The former can downscale or upscale the input using a non-linear filter, or an artificial neural network based on the provided parameters. If s<1, the resizer is upscaling input pixel blocks by 1/s, for instance, if s=0.25, each input pixel will be converted to 4 pixels at the output of the resizer. If s>1, then the resizer is downscaling by s, i.e., on average, s pixels will become 1 pixel after the resizer. The value of s can be provided externally, or can be tuned in other embodiments, and s can be any fractional number, but can also be unity (s=1), with the latter corresponding to no resizing. The effect of the resizer is inverted at the post-decoding resizing component shown on the right-hand side of FIG. 1 and the recovered pixel groups can form a recovered image of the original resolution to be displayed to a viewer after an optional post-processing component, which can be a linear or non-linear filter or an artificial neural network that enhances aesthetic or perceptual aspects of the recovered image.

In-between the output of the deep video precoding with Q-R loss of FIG. 1 and the decoder, an external image or video encoder is used, which may comprise any ISO JPEG or ISO MPEG or AOMedia encoder, or any other proprietary encoder. In addition, as shown in FIG. 1, the produced bitstream from the encoder can be stored or transmitted over a network to the corresponding decoder.

Figure 2C:
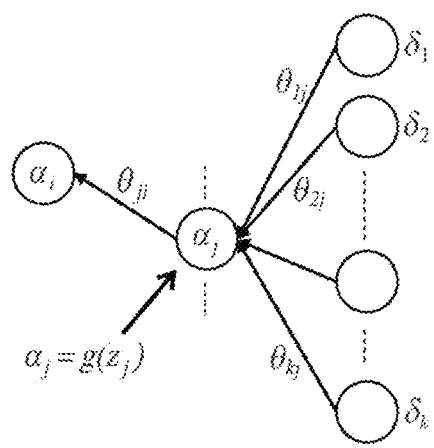

The deep quality-rate optimizer (DQRO) as shown in FIG. 1 can comprise any combination of weights connected in a network and having a non-linear function (akin to an activation function of an artificial neural network). An example of such weights is shown in FIG. 2(a). The trained DQRO comprises multiple layers of weights and activation functions. An example of the connectivity between weights and inputs is shown in FIG. 2(b). That is, FIG. 2(a) shows a combination of inputs $x_0, \ldots, x_3$ with weight coefficients $\Theta$ and non-linear activation function g( ), and FIG. 2(b) is a schematic diagram showing layers of interconnected activations and weights, forming an artificial neural network. Such examples are trained with back-propagation of errors computed at the output layer, using gradient descent methods. This is shown in FIG. 2(c), which depicts schematically the back-propagation of errors δ from an intermediate layer (right-hand side of FIG. 2(c)) to the previous intermediate layer using gradient descent.

Figure 3:
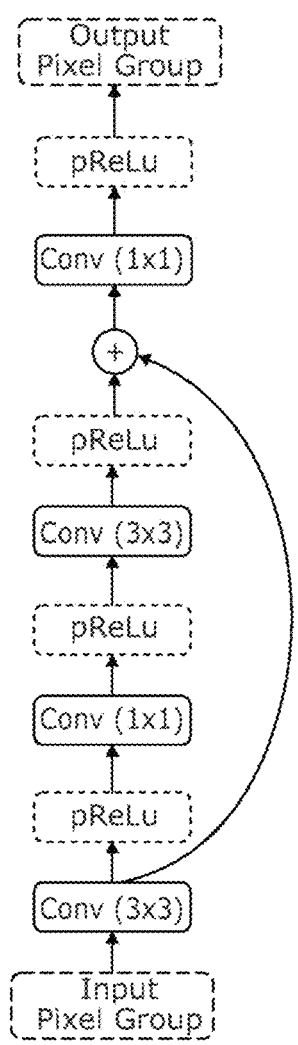
FIG. 3 is a schematic diagram showing a preprocessing network in accordance with embodiments.

An example of the deep conditional precoding is shown in FIG. 3. It consists of a cascade of convolutional (Cony (k×k)) and parametric ReLu (pReLu) layers of weights and activation functions mapping input pixel groups to transformed output pixel groups, akin to the example shown in FIG. 2(b). Convolutional layers extend the example of FIG. 2(b) to multiple dimensions, by performing convolution operations between multi-dimensional filters of fixed kernel size (k×k) with learnable weights and the inputs to the layer. Each activation in the output of the convolutional layer only has local (not global) connectivity to a local region of the input. The connectivity of the cascade of convolutional layers and activation functions can also include skip connections, as shown by the connection from the output of the leftmost "Cony (3×3)" layer of FIG. 3 to the summation point of FIG. 3. In addition, the entirety of the cascade of multiple layers (also known as a deep neural network) is trainable end-to-end based on back-propagation of errors from the output layer backwards (e.g. as shown in FIG. 2(c)), using gradient descent methods.

Figure 4:
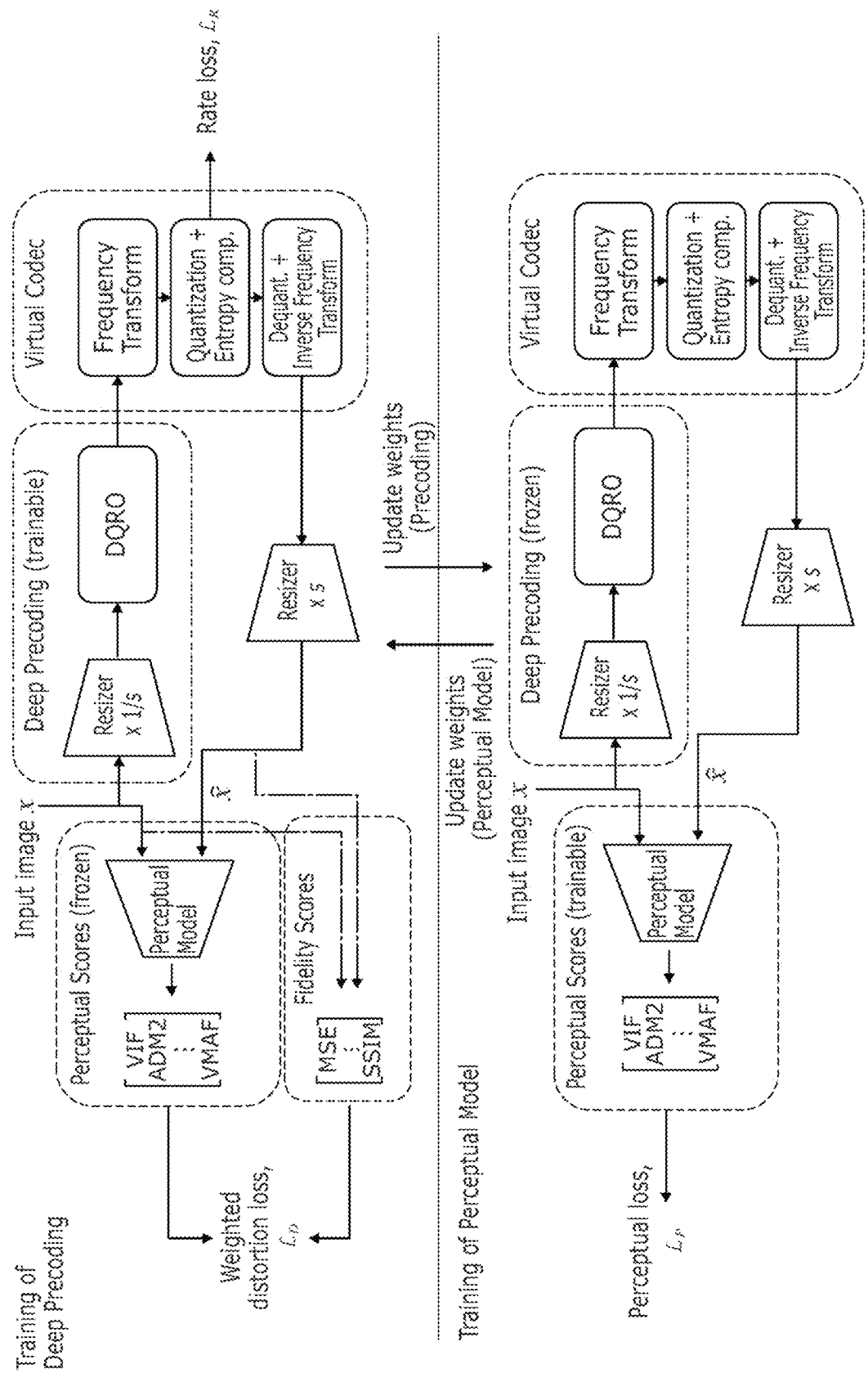
FIGS. 4 to 6 are schematic diagrams showing example training processes in accordance with embodiments.
Figure 5:
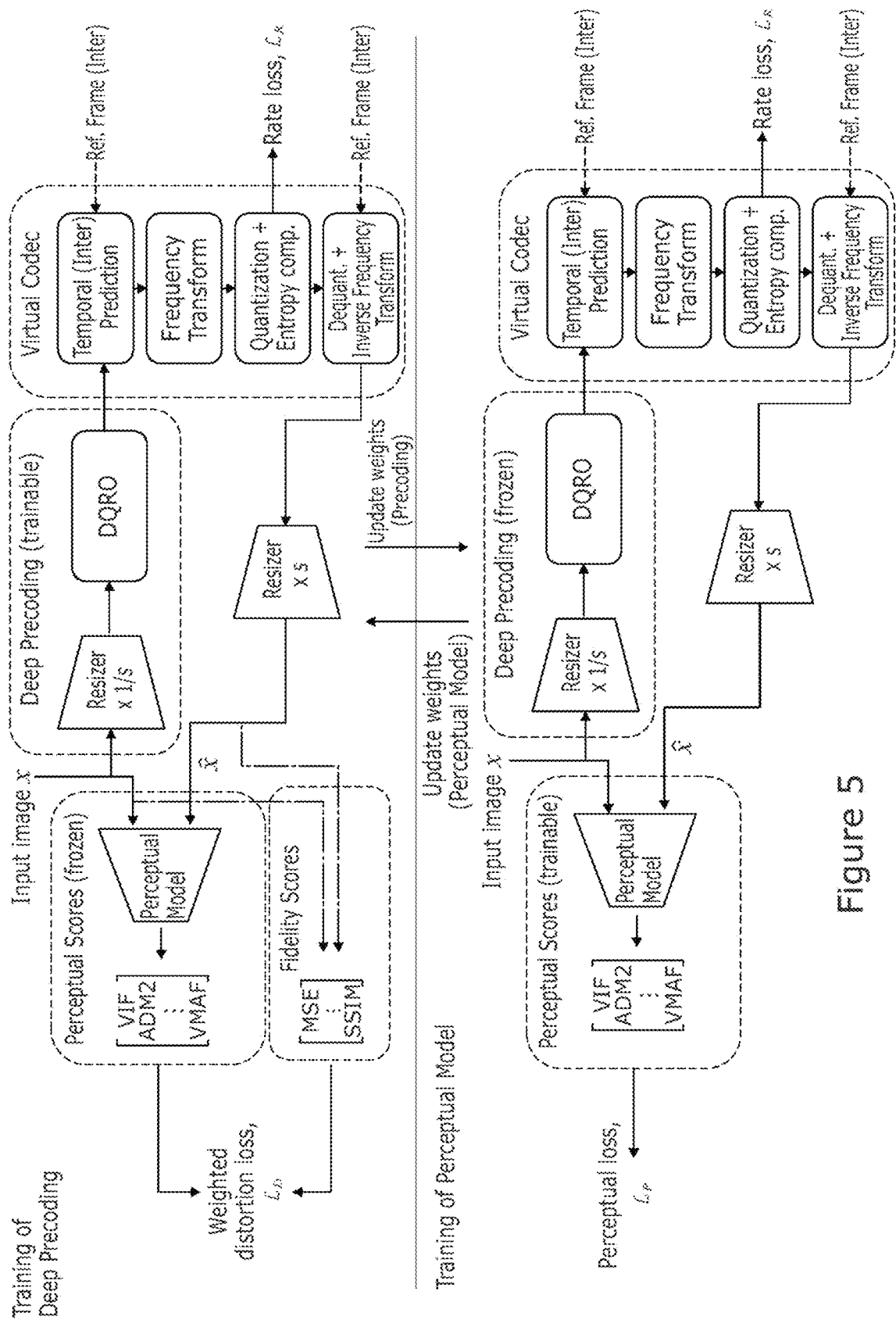

FIGS. 4 and 5 depict methods of training the preprocessing network (i.e. the deep precoding model) according to embodiments. In FIG. 4, no temporal prediction is used, whereas in FIG. 5 temporal prediction is used for inter-frames in video sequences. The top-half of each of FIGS. 4 and 5 shows training of the deep precoding model with the utilized perceptual model not being trained, i.e., in a "frozen" state. The bottom-half of each of FIGS. 4 and 5 illustrates the training of the perceptual model, with the deep precoding model not being trained, i.e., in a frozen state. Arrows extending between the top-half and the bottom-half of each of FIGS. 4 and 5 depict iterations of weight updates between training of the perceptual model and the precoding model. The overall training process consists of the interleaving between training one model and freezing the other, and iteratively refining both models via this process. The overall training system has multiple components, which will now be discussed in turn.

The perceptual model comprises two parts; both parts take as input the input image x and a DQRO-optimized and distorted image $\hat{x}$ and estimate a number of objective, subjective or aesthetic scores for image $\hat{x}$. The scores can be reference-based scores, i.e., scores comparing $\hat{x}$ to x, but can also be non-reference scores, as employed in blind image quality assessment methods. The perceptual model can approximate non-differentiable perceptual score functions, including VIF, ADM2 and VMAF, with continuous differentiable functions. The perceptual model can also be trained to output human rater scores, including MOS or distributions over ACR values. Specifically, the perceptual model uses artificial neural networks with weights and activation functions, and connectivity between layers (e.g. as shown in FIG. 2(b)), but also comprises extensions or an array of multiple such modules, interconnected in a parallel and sequential (cascade) manner. In order to train the perceptual model (bottom-half of FIG. 4), the perceptual loss $\mathcal{L}_P$ is minimized, which is the aggregated difference (or error) between the predicted vectorized perceptual scores and the reference vectorized scores per input (from numerical computation or human raters). The loss function between the predicted and reference scores can be norm-based (e.g., mean squared error or mean absolute error) or distribution based (e.g., by employing adversarial training with a discriminator to align the predicted and reference distributions over metric space). However, other embodiments of this loss function comprise non-linear combinations of perceptual scores using logarithmic, harmonic, exponential, and other non-linear functions. In order to train the deep precoding model (top-half of FIG. 4), the predicted perceptual scores are first combined with predicted fidelity scores that represent pixel-wise or structural reconstruction of the input x. The fidelity scores, such as SSIM, MS-SSIM and PSNR, are fully differentiable and can be computed directly from x and $\hat{x}$. The deep precoding model (including DQRO and optional resizing) is trained by optimizing the distortion loss $\mathcal{L}_D$ over the weighted and combined perceptual and fidelity scores. Specifically, each score is maximized or minimized in the direction of increasing perceptual or aesthetic quality, in order to achieve a balance in $\hat{x}$ between perceptual enhancement over x and faithful reconstruction of x. The weighting and combination of scores in FIG. 4 comprises a linear function of the type $c_1 s_1 + c_2 s_2 + \ldots + c_N s_N$, where $c_1, \ldots, c_N$ are the weights and $s_1, \ldots, s_N$ are the predicted quality scores, and the same weights are applied for the measured scores from the training image. However, other examples of this loss function comprise non-linear combinations of these scores using logarithmic, harmonic, exponential, and other non-linear functions.

The deep precoding model shown in the training process of FIGS. 4 and 5 corresponds to the design shown in FIG. 3, comprising an optional resizing and deep quality-rate optimizer (DQRO), and corresponds to the deep video precoding block deployed in FIG. 1. However, other variations are also possible. Training of the DQRO is carried out with back propagation and any variation of gradient decent from the weighted distortion loss and the rate loss of FIG. 4. Parameters of the learning process, such as the learning rate, the use of dropout and other regularization options to stabilize the training and convergence process are applied.

A virtual codec module is also used in the framework depicted in FIGS. 4 and 5. Two examples of this module are illustrated in FIGS. 4 and 5 respectively. The virtual codec module in FIG. 4 consists of a frequency transform component, a quantization and entropy encoding component and a dequantization and inverse transform component. The purpose of the virtual codec module is to emulate a typical image or video encoder using differentiable and learnable components, such as the layers of an artificial neural network. The frequency transform component is any variation of discrete sine or cosine transform or wavelet transform, or an atom-based decomposition. The dequantization and inverse transform component can convert the transform coefficients back into approximated pixel values. The main source of loss for the virtual codec module comes from the quantization component, which emulates any multi-stage deadzone or non-deadzone quantizer. Finally, the entropy coding component can be a continuous differentiable approximation of theoretical (ideal) entropy over transform values, or continuous differentiable representation of a Huffman encoder, an arithmetic encoder, a runlength encoder, or any combination of those that is also made to be context adaptive, i.e., looking at quantization symbol types and surrounding values (context conditioning) in order to utilize the appropriate probability model and compression method. The rate loss $\mathcal{L}_R$ is calculated by minimizing the rate predicted from the virtual codec model processing (i.e., virtually encoding and decoding) the quantized coefficients stemming from the DQRO pixels, subject or not subject to a rate constraint on the upper rate bound. This rate loss is optimized as a function of the deep precoding weights, by back-propagation using variations of gradient descent methods, in order to train the deep precoding. Beyond its utility as a rate estimator, the virtual codec module produces the distorted (or corrupted) DQRO outputs, i.e., signal $\hat{x}$ in FIG. 4, which is used to train the non-differentiable part of the perceptual model (bottom of FIG. 4). In addition, prior or during the training of the DQRO itself, any parameters associated with the virtual codec module can also be empirically tuned or trained with backpropagation and gradient descent methods. This entails training any transform and quantization parameters that are differentiable, and also the artificial neural network parameters used to represent the non-differentiable mathematical operations of the transform and quantization parts with differentiable approximations, by using the actual rate to encode the same pixels with a lossy JPEG, MPEG or AOMedia open encoder as a reference.

The virtual codec module in FIG. 5 extends that of FIG. 4 by incorporating a temporal prediction module prior to the frequency transform for emulating video encoding of inter-frames in a video sequence. Specifically, the temporal prediction module receives the output pixels of DQRO and a reference frame. The difference between the reference frame and DQRO output is computed block-wise and the error frame is passed to the frequency transform. The dequantization and inverse frequency transform also receives the reference frame, in order to reconstruct a frame representation of the input x for perceptual modelling. For intra-frames, the temporal prediction module can simply be treated as an identity function and bypassed, as in FIG. 4.

In the embodiments shown in FIGS. 4 and 5, the perceptual model and the deep precoding are both trained in intervals and, after training one, its updated weights and parameters are frozen while training the other. This weight update and interleaved training improves both and allows for end-to-end training and iterative improvement both during the training phase, but also at any time during the system's operation. An example of this is when new images and quality scores are added into the system, or new forms of transform and quantizer and entropy encoding modes are added, which correspond to a new or updated form of image or video encoding, or new types of image content, e.g., cartoon images, images from computer games, virtual or augmented reality applications, etc. Alternatively, instead of iterative training, the perceptual model can be pre-trained on representative examples and persist as frozen throughout training of the deep precoding (i.e., only top half of FIGS. 4 and 5).

Figure 6:
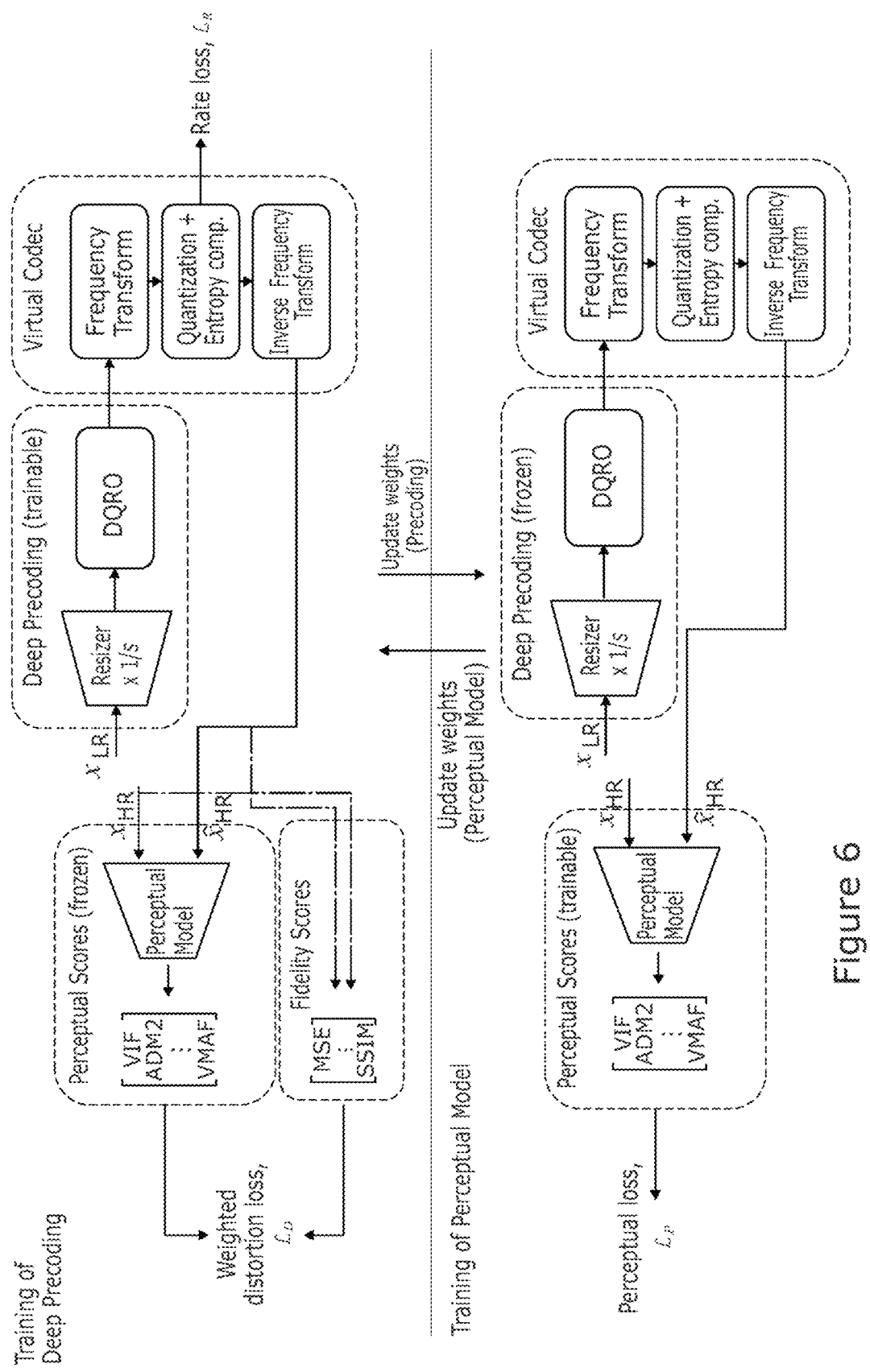

FIG. 6 shows a variant of the example of FIG. 4 for perceptually enhanced and rate-constrained super-resolution of images or video. In this case, the objective is to optimally upscale a given low-resolution image or video frame $x_{LR}$ and scale factor s<1. During training, low resolution and high resolution input pairs, $x_{LR}$ and $x_{HR}$ pairs are provided, where the function mapping may be known or unknown. The low resolution inputs $x_{LR}$ are upscaled by the resizer, which is can be any off-the-shelf pre-trained super-resolution model or other artificial neural network comprising multiple convolutional layers and activation functions. The output is then passed through a deep quality-rate optimizer (DQRO) that represents a pixel-to-pixel mapping. The rate of the DQRO output is thus modelled by a virtual codec and optimized with rate loss $\mathcal{L}_R$, with the virtual codec as described for the illustration of FIG. 4. The output of the virtual codec $\hat{x}_{HR}$ is an upscaled representation of the high resolution input $x_{HR}$. As such, $x_{HR}$ and $\hat{x}_{HR}$ can be passed to the perceptual model, and perceptual and reconstruction quality optimized with distortion loss $\mathcal{L}_D$ and iterative training with $\mathcal{L}_D$ and $\mathcal{L}_P$, as described above with reference to FIG. 4. The deep precoding module can thus be deployed for deep video precoding on a remote server, e.g. as shown in FIG. 1, or as a replacement for post-decoding resizing on the client, in order to generate upscaled and perceptually enhanced images or frames.

Figure 7:
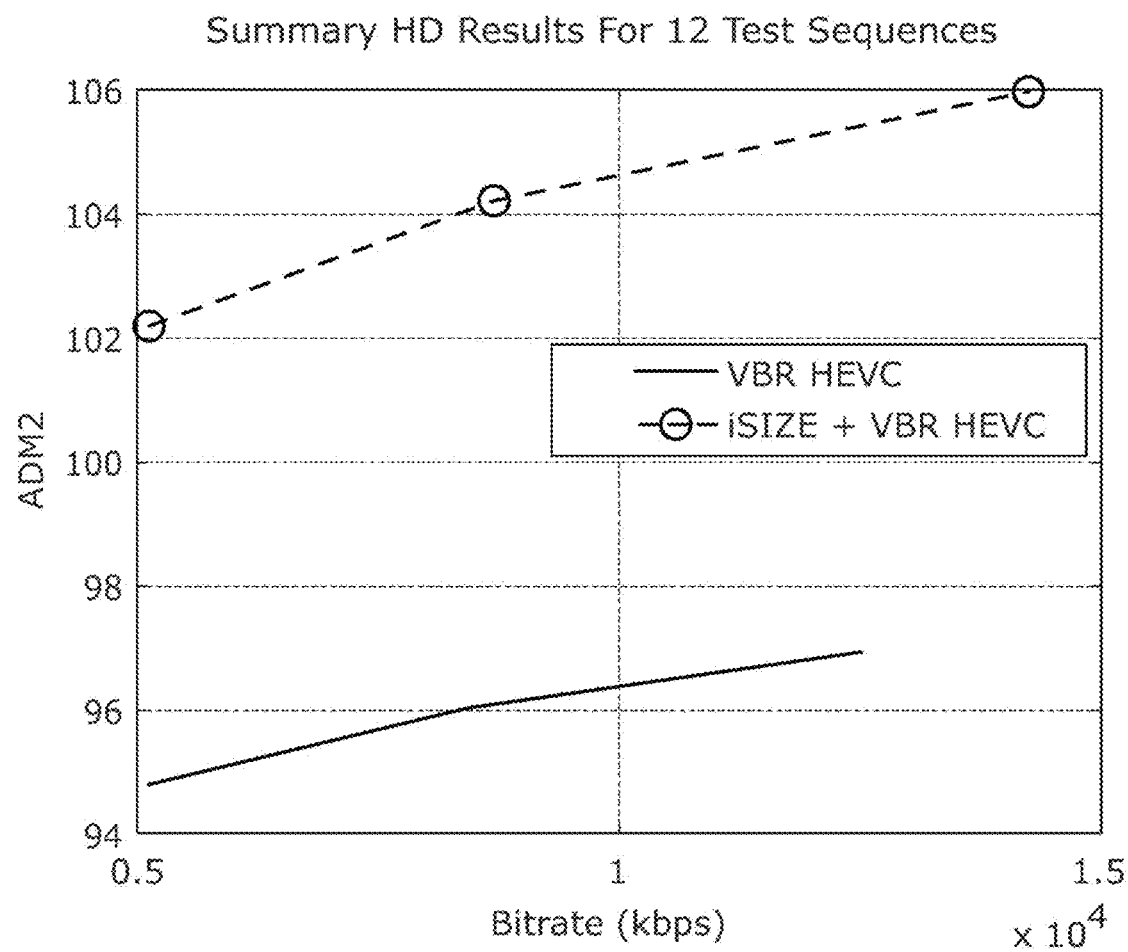
FIGS. 7 to 9 are graphs of quality vs bitrate results in accordance with embodiments.
Figure 8:
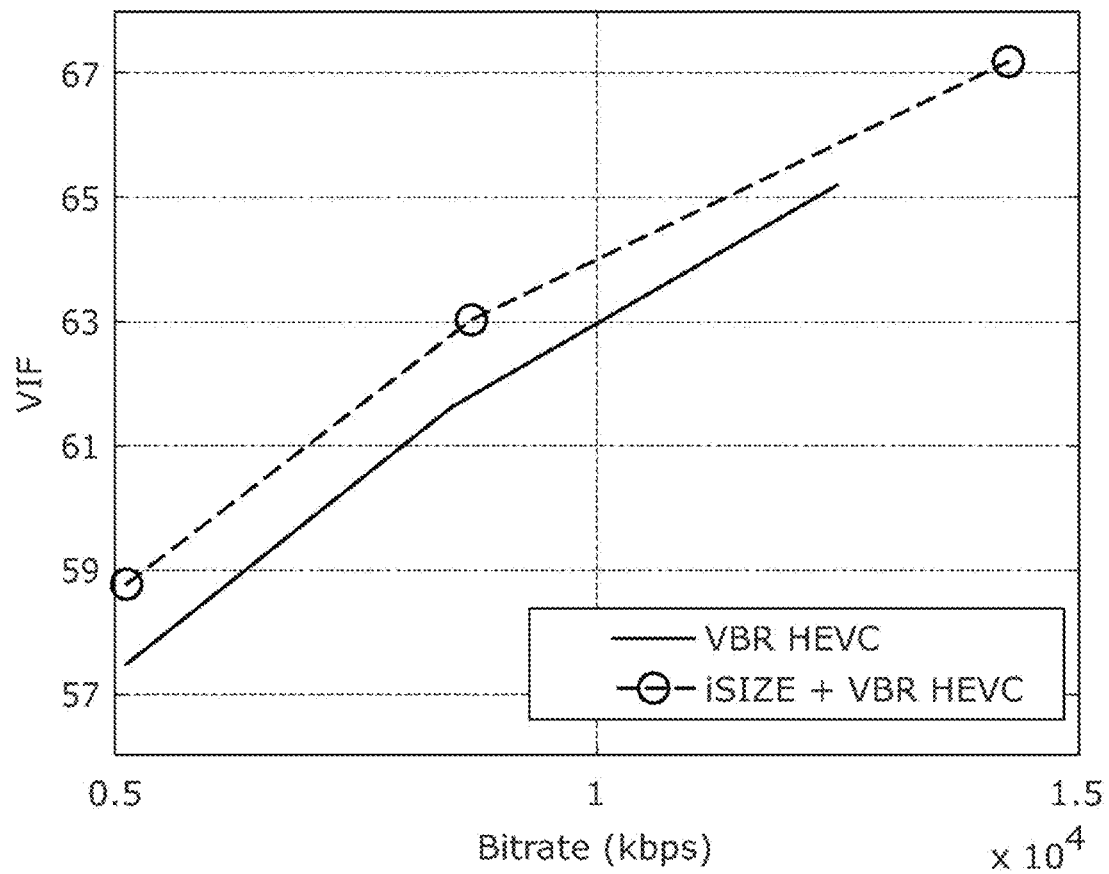
Figure 9:
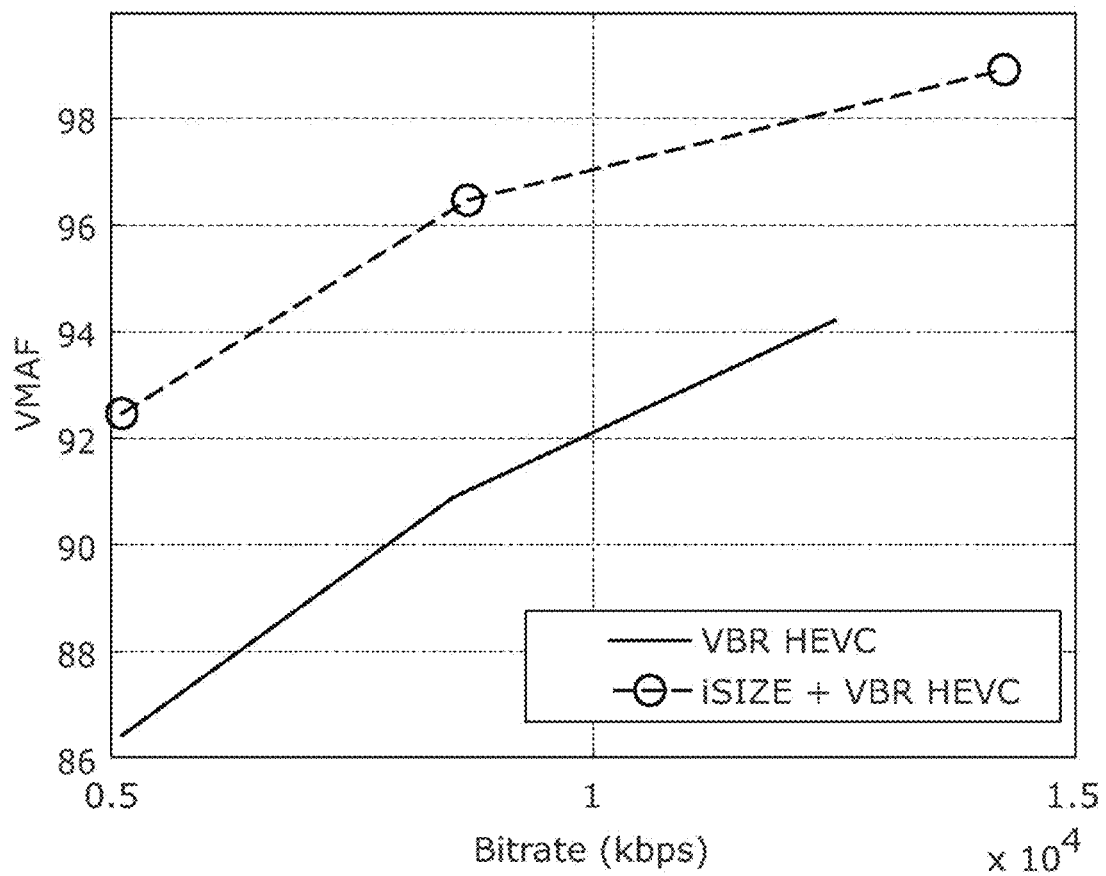

Results from example embodiments of the present disclosure invention include, but are not limited to, those presented in FIG. 7 to FIG. 9, which utilize the MPEG/ITU-T H.264/HEVC video codec as embodied by the open-source FFmpeg libx265 library. The quality-bitrate curves shown in FIGS. 7-9 show examples of average quality vs bitrate results achieved with the disclosed methods on 12 Full HD video sequences (1920×1080 pixels) and no resizing. The results shown in FIG. 7 use as a quality measure the ADM2 metric of the Netflix VMAF library. In FIG. 8, quality is measured using the VIF metric of the Netflix VMAF library. In FIG. 9, quality is measured using the VMAF metric of the Netflix VMAF library. In each case, quality is measured for FFmpeg and video encoding after the produced precoded pixel output of the disclosed deep precoder was carried out with an HEVC encoder configured under variable-bitrate rate control (VBR). Beyond the presented embodiments, the methods described herein can be realized with the full range of options and adaptivity described in the previous examples, and all such options and their adaptations are covered by this disclosure.

Figure 10:
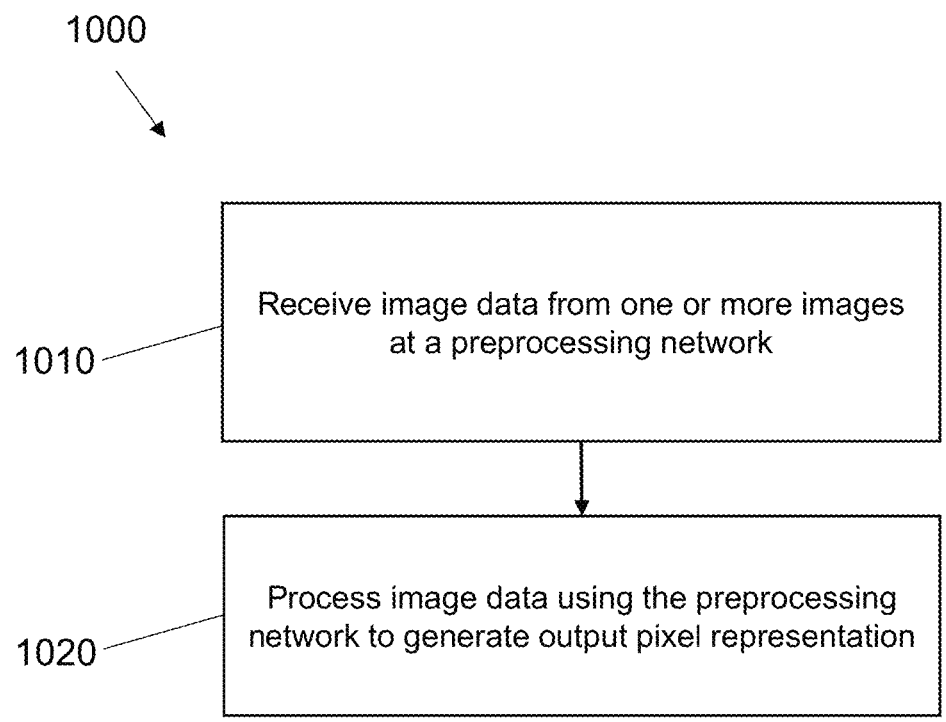
FIG. 10 is a flowchart showing the steps of a method of preprocessing image data in accordance with embodiments.

FIG. 10 shows a method 1000 for preprocessing image data using a preprocessing network comprising a set of inter-connected weights. The method 1000 may be performed by a computing device, according to embodiments. The method 1000 may be performed at least in part by hardware and/or software. The preprocessing is performed prior to encoding the preprocessed image data with an external encoder. At item 1010, image data from one or more images is received at the preprocessing network. The image data may be retrieved from storage (e.g. in a memory), or may be received from another entity. At item 1020, the image data is processed using the preprocessing network (e.g. by applying the weights of the preprocessing network to the image data) to generate an output pixel representation for encoding with the external encoder. The weights of the preprocessing network are trained to optimise a combination of: at least one quality score indicative of the quality of the output pixel representation; and a rate score indicative of the bits required by the external encoder to encode the output pixel representation. In embodiments, the method 1000 comprises encoding the output pixel representation, e.g. using the external encoder. The encoded output pixel representation may be transmitted, for example to a display device for decoding and subsequent display.

Figure 11:
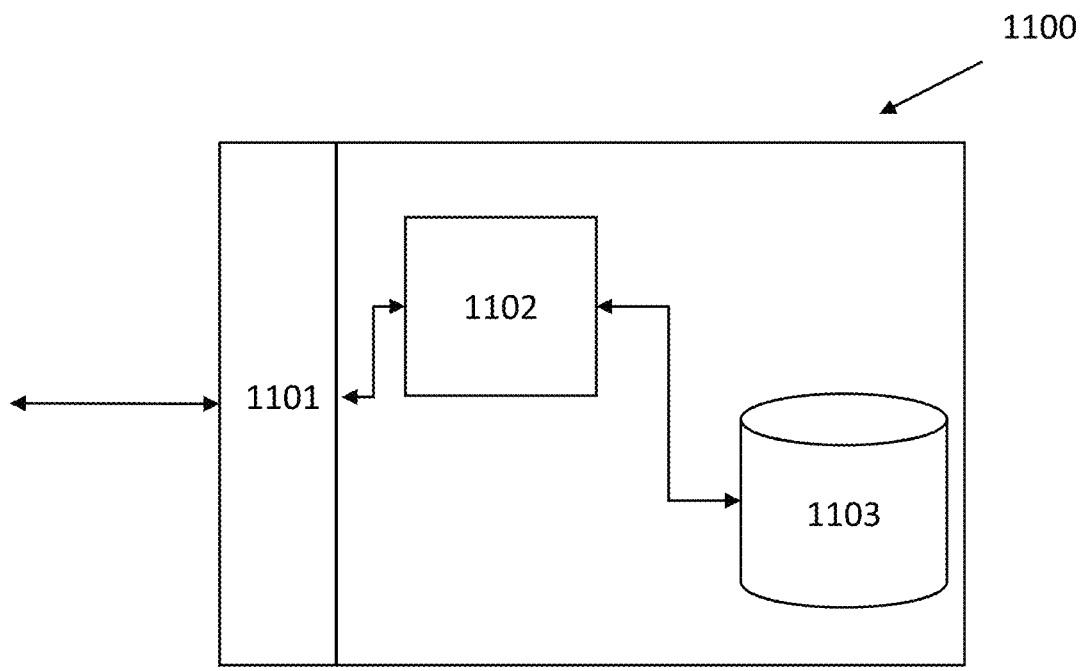
FIG. 11 is a schematic diagram of a computing device in accordance with embodiments.

Embodiments of the disclosure include the methods described above performed on a computing device, such as the computing device 1100 shown in FIG. 11. The computing device 1100 comprises a data interface 1101, through which data can be sent or received, for example over a network. The computing device 1100 further comprises a processor 1102 in communication with the data interface 1101, and memory 1103 in communication with the processor 1102. In this way, the computing device 1100 can receive data, such as image data or video data, via the data interface 1101, and the processor 1102 can store the received data in the memory 1103, and process it so as to perform the methods of described herein, including preprocessing image data prior to encoding using an external encoder, and optionally encoding the preprocessed image data.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Various measures (including methods, apparatus, computing devices and computer program products) are provided processing pixel data from a single or a plurality of images or video frames using a set of weights inter-connected in a network that is configured to convert inputs into a pixel representation that minimizes the combination of the following two items: (i) objective metrics assessing signal distortion and scores assessing the loss of perceptual or aesthetic quality, either independently or based on the input single image or plurality of images; (ii) a score representing the bits-per-pixel (bpp) rate or bits-per-second (bps) necessary to encode the new pixel representation with an external image or video encoder that is designed to minimize bpp and keep the image fidelity as high as possible according to its own image fidelity score.

In embodiments, the resolution of the pixel data is increased or decreased in accordance to a given upscaling or downscaling ratio that can be an integer or fractional number and also includes ratio of 1 (unity) that corresponds to no resolution change. In embodiments, the output is mapped with a linear or non-linear combinations of weights, which are inter-connected in a network and can include non-linearities such as activation functions and pooling layers.

In embodiments, the output is corrupted to introduce fidelity loss akin to that expected by a lossy image or video encoder. The method of corrupting may be made to be mathematically differentiable functions by approximation of the non-differentiable operators with a mixture of differentiable ones and appropriate approximation.

In embodiments, the (optionally upscaled or downscaled) pixel representation is resized to the original image or video resolution using a linear or non-linear filter and measures during a set-up or training phase.

In embodiments, set-up or training-phase measurements are used to optimize: (i) a quality score that is representing objective, perceptual, aesthetic or human opinion on the resized pixel representation in the direction of improved visual quality or reconstruction; (ii) a rate score representing the bits-per-pixel (bpp) or bits per second (bps) necessary to encode the pixel representation with an external image or video encoder, in the direction of lower rate.

In embodiments, the combination of quality and bpp or bps rate scores is optimised according to a linear or non-linear optimization method that adjusts the weights of the networks and the type of the architecture used to interconnect them.

In embodiments, the linear or non-linear optimization method is any combination of back-propagation learning and gradient descent updates of weights or errors computed from the utilized scores and the set-up or training phase measurements.

In embodiments, individual or groups of new quality and bpp or bps-optimized pixel representations are passed into a subsequent image or video encoder to be encoded and stored on a computer memory or disk, or transmitted over a network.

In embodiments, the downscaling or upscaling method is a linear or non-linear filter, or a learnable method based on data and back-propagation based training with gradient descent methods.

In embodiments, the utilized encoder is a standards-based image or video encoder such as an ISO JPEG or ISO MPEG standard encoder, or a proprietary or royalty-free encoder, such as, but not limited to, an AOMedia encoder.

In embodiments, a linear filter is used, wherein the filter may be a blur or edge-enhancement filter.

In embodiments, high resolution and low resolution image or video pairs are provided and the low resolution image is upscaled and optimized to improve and/or match quality or rate to the high resolution image.

In embodiments, the quality score to be minimized includes one or more of the following objective, perceptual or aesthetic image quality scores: peak-signal-to-noise ratio, structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics, such as those described by Deng, Y., Loy, C. C. and Tang, X., in their article: "Image aesthetic assessment: An experimental survey". IEEE Signal Processing Magazine, 34(4), pp. 80-106, 2017" and variations of those metrics.

In embodiments, the score representing the bpp or bps rate to encode the new pixel representation is modelled with a set of equations that express the expected bpp or bps rate needed by a standard image or video encoder.

In embodiments, the score representing the bpp or bps rate to encode the new pixel representation is trained with back-propagation and gradient descent methods and training data that is representative of the bpp or bps rate of the encoder utilized to compress the new pixel representation and the disclosed invention.

In embodiments, the plurality of quality scores and the bpp or bps rate score are combined with linear or non-linear weights and these weights are trained based on back-propagation and gradient descent methods with representative training data.

In embodiments, the utilized corruption method expresses the corruption expected from a typical block-based transform and quantization used in a block-based image or video encoder.

In embodiments, the utilized corruption method expresses the corruption expected from the transform and quantization of errors computed from a typical block-based temporal prediction process used in a block-based image or video encoder.

In embodiments, the corruption methods used are made to be mathematically differentiable functions, with parameters that are trained with any combination of back-propagation learning and gradient descent updates.

In embodiments, the set of equations that express the expected bps or bpp rate needed by a standard video encoder for encoding a video sequence can include both rates for inter and intra-frame encoding depending on the type of frame being encoded.

In embodiments, the training of the quality or rate methods, or the training of the network weights to process the input pixels, or the training of the corruption methods are performed at frequent or in-frequent intervals with new measurements from quality, bpp rate scores and corrupted images from encoded image data from external image or video encoders, and the updated weights, models or corruption methods or differentiable functions replace the previously-utilized ones.

Various measures (including methods, apparatus, computing devices and computer program products) are provided for processing image data from one or more images using a network comprising set of inter-connected weights, wherein the network is arranged to take as input image data and output a pixel representation, and is further arranged to minimize: at least one quality score indicative of the quality of the image data; and a rate score indicative of the bits required by an image or video encoder to encode the output pixel representation.

In embodiments, the at least one quality score is indicative of signal distortion in the image data. In embodiments, the at least quality score is indicative of loss of perceptual or aesthetic quality in the image data.

In embodiments, the bits required by the image or video encoder are bits-per-pixel or bits-per-second. In embodiments, the image or video encoder is arranged to minimize bits-per-pixel. In embodiments, the image or video encoder is arranged to maximise image fidelity in accordance with an image fidelity score.

In embodiments, the one or more images are video frames.

In embodiments, the resolution of the pixel representation is increased or decreased in accordance with an upscaling or downscaling ratio. In embodiments, the upscaling or downscaling ratio is an integer or fractional number.

In embodiments, the pixel representation is corrupted. In embodiments, the step of corrupting the pixel representation is performed by one or more mathematically differentiable functions and an approximation.

In embodiments, the pixel representation is resized to the resolution of the input image data. In embodiments, the resizing is performed by a linear or non-linear filter. In embodiments, the linear or non-linear filter is configured during an initial setup or training phase.

In embodiments, during an initial setup or training phase, the following are optimised: a quality score indicative of objective, perceptual, aesthetic or human opinion on the resized pixel representation, in the direction of improved visual quality or reconstruction; and a rate score indicative of the bits-per-pixel or bits-per-second required to encode the pixel representation by an image or video encoder, in the direction of lower rate.

In embodiments, the combination of the at least one quality score and rate score are optimised according to a linear or non-linear optimization method that adjusts the weights of the network. In embodiments, the combination of the at least one quality score and rate score are optimised according to a linear or non-linear optimization method that adjusts the type of the architecture used to interconnect the weights of the network. In embodiments, the linear or non-linear optimization method is any combination of back-propagation learning, gradient descent updates of weights or errors computed from the at least one quality score and rate score, and set-up or training phase measurements.

In embodiments, the pixel representation is encoded with an image or video encoder. In embodiments, the image or video encoder is an ISO JPEG or ISO MPEG standard encoder, or an AOMedia encoder.

In embodiments, downscaling or upscaling is performed using a linear or non-linear filter, or a learnable method based on data and back-propagation based training with gradient descent methods.

In embodiments, the pixel representation is filtered using a linear filter. In embodiments, the linear filter is a blur or edge-enhancement filter.

In embodiments, high resolution and low resolution image or video pairs are provided, and wherein the low resolution image is upscaled and optimized to improve and/or match quality or rate to the high resolution image.

In embodiments, the at least one quality score includes one or more of the following: peak-signal-to-noise ratio, structural similarity index metric (SSIM), multiscale quality metrics, detail loss metric or multiscale SSIM, metrics based on multiple quality scores and data-driven learning and training, video multi-method assessment fusion (VMAF), aesthetic quality metrics.

In embodiments, the rate score is modelled with a set of equations that express the expected rate needed by a standard image or video encoder. In embodiments, the rate score is trained with back-propagation and gradient descent methods and training data that is representative of the rate of an encoder utilized to compress the pixel representation.

In embodiments, the at least one quality score and the rate score are combined with linear or non-linear weights, and wherein the linear or non-linear weights are trained based on back-propagation and gradient descent methods with representative training data.

In embodiments, the pixel representation is corrupted so as to approximate the corruption expected from a typical block-based transform and quantization used in a block-based image or video encoder.

In embodiments, the pixel representation is corrupted so as to approximate the corruption expected from the transform and quantization of errors computed from a typical block-based temporal prediction process used in a block-based image or video encoder. In embodiments, corruption is performed using mathematically differentiable functions with parameters that are trained with a combination of back-propagation learning and gradient descent updates.

In embodiments, the bits required by an image or video encoder to encode the output pixel representation is determined from rates for inter- and/or intra-frame encoding. In embodiments, inter- or intra-frame encoding rates are used depending on the type of frame being encoded.

In embodiments, the at least one quality score, the rate score, the weights of the network, and/or the corruption methods are trained, and wherein the training is performed at intervals with new measurements from the at least one quality score, rate score weights and/or corrupted images respectively as updated by the training.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

REFERENCES

[1] Dong, Jie, and Yan Ye. "Adaptive downsampling for high-definition video coding." IEEE Transactions on Circuits and Systems for Video Technology 24.3 (2014): 480-488.

[2] Douma, Peter, and Motoyuki Koike. "Method and apparatus for video upscaling." U.S. Pat. No. 8,165,197. 24 Apr. 2012.

[3] Su, Guan-Ming, et al. "Guided image up-sampling in video coding." U.S. Pat. No. 9,100,660. 4 Aug. 2015.

[4] Shen, Minmin, Ping Xue, and Ci Wang. "Down-sampling based video coding using super-resolution technique." *IEEE Transactions on Circuits and Systems for Video Technology* 21.6 (2011): 755-765.

[5] van der Schaar, Mihaela, and Mahesh Balakrishnan. "Spatial scalability for fine granular video encoding." U.S. Pat. No. 6,836,512. 28 Dec. 2004.

[6] Boyce, Jill, et al. "Techniques for layered video encoding and decoding." U.S. patent application Ser. No. 13/738, 138.

[7] Dar, Yehuda, and Alfred M. Bruckstein. "Improving low bit-rate video coding using spatio-temporal down-scaling." *arXiv preprint arXiv:* 1404.4026 (2014).

[8] Martemyanov, Alexey, et al. "Real-time video coding/decoding." U.S. Pat. No. 7,336,720. 26 Feb. 2008.

[9] Nguyen, Viet-Anh, Yap-Peng Tan, and Weisi Lin. "Adaptive downsampling/upsampling for better video compression at low bit rate." *Circuits and Systems, 2008. ISCAS 2008. IEEE International Symposium on. IEEE,* 2008.

[10] Hinton, Geoffrey E., and Ruslan R. Salakhutdinov. "Reducing the dimensionality of data with neural networks." *science* 313.5786 (2006): 504-507.

[11] van den Oord, Aaron, et al. "Conditional image generation with pixelcnn decoders." *Advances in Neural Information Processing Systems.* 2016.

[12] Theis, Lucas, et al. "Lossy image compression with compressive autoencoders." *arXiv preprint arXiv:* 1703.00395(2017).

[13] Wu, Chao-Yuan, Nayan Singhal, and Philipp Krähenbühl. "Video Compression through Image Interpolation." *arXiv preprint arXiv:* 1804.06919 (2018).

[14] Rippel, Oren, and Lubomir Bourdev. "Real-time adaptive image compression." *arXiv preprint arXiv:* 1705.05823 (2017).

[15] Golub, Gene H., and Charles F. Van Loan. *Matrix computations.* Vol. 3. JHU Press, 2012.

[16] Deng, Y., Loy, C. C. and Tang, X., "Image aesthetic assessment: An experimental survey," *IEEE Signal Processing Magazine,* 34(4), pp. 80-106, 2017.

What is claimed is:

1. A computer-implemented method of preprocessing, prior to encoding using an external encoder, image data using a preprocessing network comprising a set of inter-connected weights, the method comprising:

receiving, at the preprocessing network, image data from one or more images; and processing the image data using the preprocessing network to generate an output pixel representation for encoding with the external encoder, wherein the set of inter-connected weights of the preprocessing network are trained to optimize a combination of:

at least one quality score indicative of a quality of the output pixel representation; and a rate score indicative of a number of bits required by the external encoder to encode the output pixel representation, and wherein, during an initial setup or training phase, the at least one quality score is optimized in a direction of improved visual quality or reconstruction, and the rate score is optimized in a direction of lower rate.

2. The method according to claim 1, wherein the at least one quality score is indicative of signal distortion in the output pixel representation.

3. The method according to claim 1, wherein the at least one quality score is indicative of loss of perceptual or aesthetic quality in the output pixel representation.

4. The method according to claim 1, wherein a resolution of the output pixel representation is increased or decreased in accordance with an upscaling or downscaling ratio.

5. The method according to claim 1, further comprising the step of corrupting the output pixel representation by applying one or more mathematically differentiable functions and an approximation, wherein the output pixel representation is corrupted so as to approximate the corruption expected from a block-based transform and quantization used in the external encoder, and/or to approximate the corruption expected from a transform and quantization of errors computed from a block-based temporal prediction process used in the external encoder.

6. The method according to claim 1, further comprising the step of resizing the output pixel representation to a resolution of the image data using a linear or non-linear filter configured during the initial setup or training phase.

7. The method according to claim 1, wherein the least one quality score and the rate score are optimized according to a linear or non-linear optimization method that adjusts the set of inter-connected weights of the preprocessing network and/or adjusts a type of architecture used to interconnect the set of inter-connected weights of the preprocessing network.

8. The method according to claim 1, further comprising the step of encoding the output pixel representation with the external encoder.

9. The method according to claim 1, wherein the external encoder is an ISO JPEG or ISO MPEG standard encoder, or an AOMedia encoder.

10. The method according to claim 1, further comprising filtering the output pixel representation using a linear filter, the linear filter comprising a blur or edge-enhancement filter.

11. The method according to claim 1, wherein the at least one quality score includes one or more of the following: peak-signal-to-noise ratio, structural similarity index metric (SSIM), multiscale quality metrics, detail loss metric or multiscale SSIM, metrics based on multiple quality scores and data-driven learning and training, video multi-method assessment fusion (VMAF), or aesthetic quality metrics.

12. The method according to claim 1, wherein the at least one quality score and the rate score are combined with linear or non-linear weights, and wherein the linear or non-linear weights are trained based on back-propagation and gradient descent methods with representative training data.

13. A computing device comprising:
a memory comprising computer-executable instructions;
a processor configured to execute the computer-executable instructions and cause the computing device to:
  receive, at a preprocessing network, image data from one or more images; and
  process the image data using the preprocessing network to generate an output pixel representation for encoding with an external encoder,
  wherein a set of inter-connected weights of the preprocessing network are trained to optimize a combination of:
    at least one quality score indicative of a quality of the output pixel representation; and
    a rate score indicative of a number of bits required by the external encoder to encode the output pixel representation, and
  wherein, during an initial setup or training phase, the at least one quality score is optimized in a direction of improved visual quality or reconstruction, and the rate score is optimized in a direction of lower rate.

14. A non-transitory computer-readable medium comprising computer-executable instructions that, when executed by a processor of a computing device, cause the computing device to perform a method, the method comprising:
  receiving, at a preprocessing network, image data from one or more images; and
  processing the image data using the preprocessing network to generate an output pixel representation for encoding with an external encoder,
  wherein a set of inter-connected weights of the preprocessing network are trained to optimize a combination of:
    at least one quality score indicative of a quality of the output pixel representation; and
    a rate score indicative of a number of bits required by the external encoder to encode the output pixel representation, and
  wherein, during an initial setup or training phase, the at least one quality score is optimized in a direction of improved visual quality or reconstruction, and the rate score is optimized in a direction of lower rate.

15. The computing device according to claim 13, wherein the at least one quality score is indicative of signal distortion in the output pixel representation.

16. The computing device according to claim 13, wherein the at least one quality score is indicative of loss of perceptual or aesthetic quality in the output pixel representation.

17. The computing device according to claim 13, wherein a resolution of the output pixel representation is increased or decreased in accordance with an upscaling or downscaling ratio.

18. The non-transitory computer-readable medium according to claim 14, wherein the at least one quality score is indicative of signal distortion in the output pixel representation.

19. The non-transitory computer-readable medium according to claim 14, wherein the at least one quality score is indicative of loss of perceptual or aesthetic quality in the output pixel representation.

20. The non-transitory computer-readable medium according to claim 14, wherein a resolution of the output pixel representation is increased or decreased in accordance with an upscaling or downscaling ratio.

* * * * *